United States Patent
Auer

[11] 3,831,017
[45] Aug. 20, 1974

[54] SELECTOR TURRET FOR FIBER OPTIC CABLES

[75] Inventor: William F. Auer, Des Plaines, Ill.

[73] Assignee: Willmark Products Company, Des Plaines, Ill.

[22] Filed: Sept. 5, 1972

[21] Appl. No.: 286,329

[52] U.S. Cl.................... 240/2 R, 128/6, 240/1 EL, 240/41.15, 350/96 B
[51] Int. Cl. ............................................ F21v 33/00
[58] Field of Search............... 240/2 R, 1 EL, 41.15; 95/44 R; 350/96 R, 96 B; 128/6, 11, 16, 18, 22, 23

[56] References Cited
UNITED STATES PATENTS

| | | | |
|---|---|---|---|
| 3,638,013 | 1/1972 | Keller............................ | 350/96 B X |
| 2,890,618 | 6/1959 | Johnson ............................. | 95/44 R |
| 3,382,353 | 5/1968 | Wappler...................... | 350/96 B X |
| 3,683,167 | 8/1972 | Rishton............................ | 240/1 EL |

*Primary Examiner*—Richard L. Moses
*Attorney, Agent, or Firm*—James B. Kinzer et al.

[57] ABSTRACT

Fiber optic cables having physically different receptor ends may be alternately related to a lamp by moving a selector having receptacles configured to accept the different receptor ends.

7 Claims, 5 Drawing Figures

PATENTED AUG 20 1974  3,831,017

SELECTOR TURRET FOR FIBER OPTIC CABLES

This invention relates to fiber optics and in particular is concerned with apparatus for selectively illuminating the receptor end faces of fiber optic cables supplied by different manufactures.

In fiber optics, light is transmitted through a so-called cable comprising a bundle of myriad thin glass fibers. From the standpoint of appearance, length and flexibility the fiber optic cable is similar to an industrial extension cord. One end of the cable is designated the receptor; it is illuminated by a lamp. The opposite end of the cable is adapted to receive a light emitter. Light is transmitted through the cable regardless of bends or complete turns which may prevail, and consequently the emitter may be used to illuminate inaccessible areas. The light emitter may be part of a probe, medical instrument or inspection device.

Physicians, for example, are skilled in the use of fiber optics and frequently require more than one instrument be ready for use.

The attendant nurse usually has the equipment ready for use by the physician; it is the responsibility of the nurse to make adjustments from the standpoint of readying one or the other of the cables, or both, on instructions from the doctor. The difficulty is that the receptor end of the cable has a fitting to be inserted in the opening of a receptacle located in front of the lamp lens which illuminates the receptor end. Consequently, the nurse may be required to fit the end of one cable, then detach it and insert another, repititiously. Assuming further that the doctor will be using two cables, switching back and forth between them, and may want two additional cables in "ready" position, each of different manufacture, the nurse, in a manner of speaking, has her hands full, to say nothing of the fact that the form of the receptor end usually varies for each manufacturer.

While the scenorio set forth above is limited to the examining room of a physician, there are other, similar situations where there is a need for equipment which will enable switching from one fiber optic cable to another, and which will also enable a plurality of fiber optic cables to be used simultaneously in spite of the fact that the receptor ends may be of different configuration. The primary object of the present invention is to develop equipment of this kind.

Other and further objects of the present invention will be apparent from the following description and claims and are illustrated in the accompanying drawing which, by way of illustration, shows a preferred embodiment of the present invention and the principle thereof and what is now considered to be the best mode in which it is contemplated applying that principle. Other embodiments of the invention emboying the same or equivalent principle may be used and structural changes may be made as desired by those skilled in the art without departing from the present invention.

Figure 2:
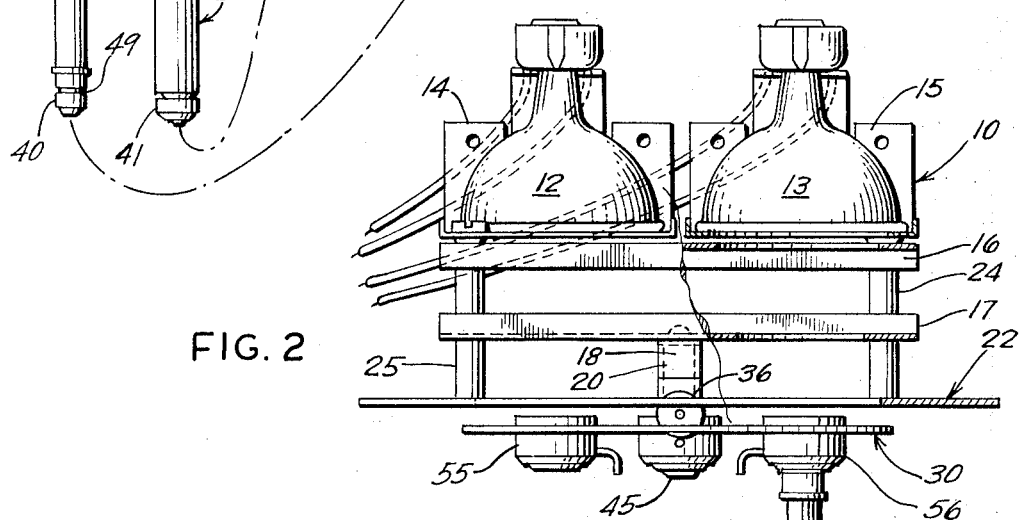
FIG. 2 is a top plan view, partly in section, of the selector shown in FIG. 1, with one of the cables attached.

The present invention is manifest in selector apparatus 10, which includes a pair of lamps 12 and 13, FIG. 2, of the kind ordinarily used to illuminate the receptor end of a fiber optic cable. The lamps 12 and 13 are respectively associated with lamp mounts 14 and 15 in turn fastened in tandem relation to a vertical support plate 16.

Figure 3:
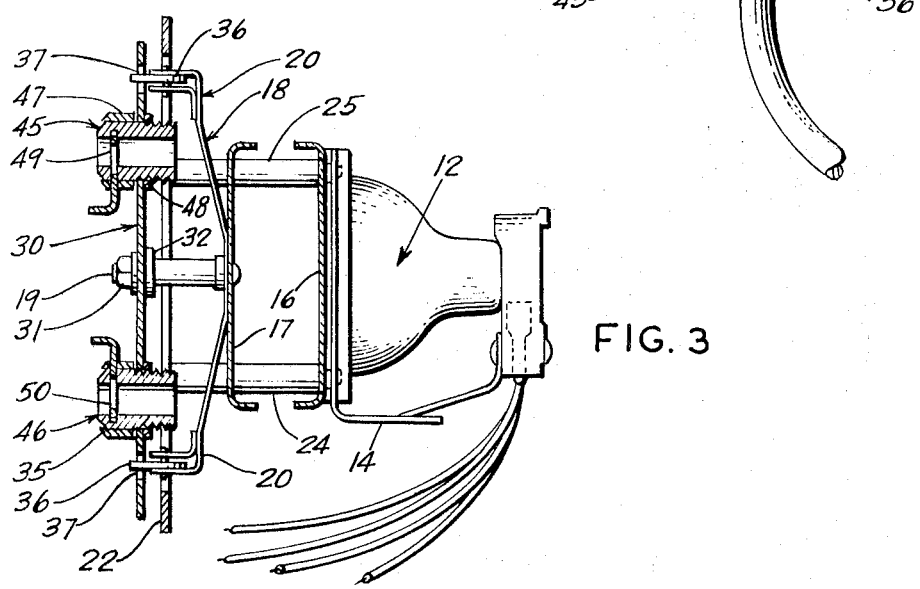
FIG. 3 is a sectional view on line 3—3 of FIG. 1.

As shown in FIG. 3, another vertical support plate 17, serving as a head shield, is located forwardly of the lamp support plate 16. The support 17 has a bracket 18 fastened thereto as by a stud 19 secured to plate 17 and extending forwardly therefrom. The bracket 18 is of spring steel, having two arms 20 supporting an indexer as will be described.

Figure 1:
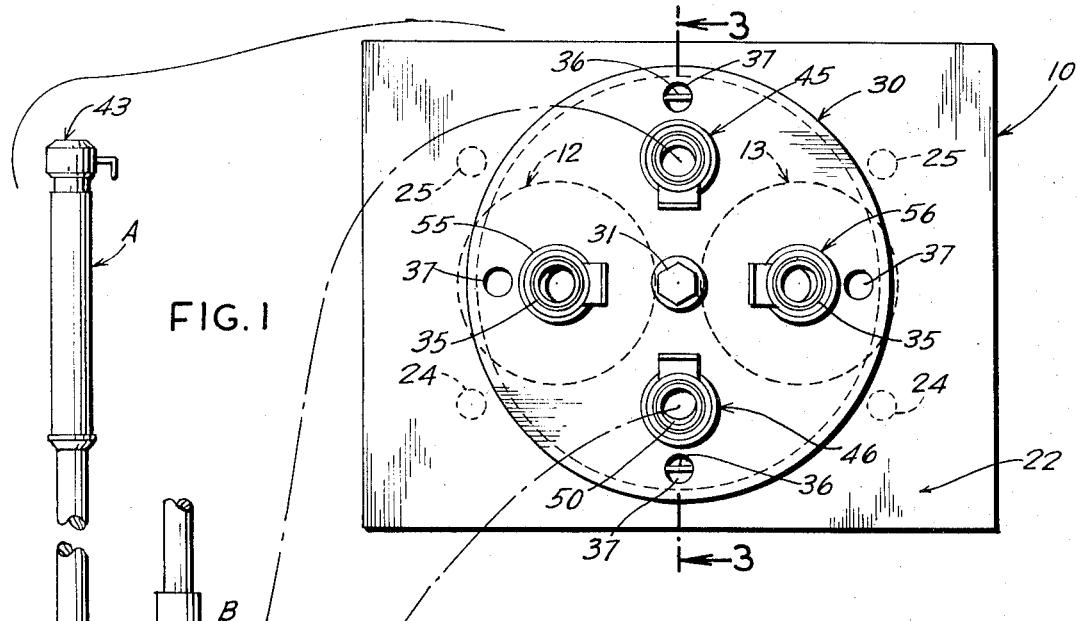
FIG. 1 is an elevational view of selector apparatus constructed in accordance with the present invention including a partial showing of two fiber optic cables to be used therewith.

A third plate 22, FIGS. 1, 2 and 3, is located forwardly of the support plate 17. Plate 22 may constitute the outer wall of the instrument case (not shown) or a hinged door (not shown) serving the same purpose may be juxtaposed on plate 22. The three plates 16, 17 and 22 are rigidly joined and accurately separated by spacers 24 and 25, FIG. 3, riveted in place. The details of the construction and assembly just described play no role in the principles of the invention. Essentially, the spacers 24 and 25 are rigidly attached to the front plate 22 and extend rearwardly therefrom to support the heat shield 17 and the lamp support plate 16. The latter is provided with two large apertures so that light from the lamps may be projected forwardly; plate 17 is provided with similar apertures, and front plate 22 has a single large circular aperture to pass light from the lamps.

The stud 19, fastened to the support plate 17, constitutes the rotary axis of a circular selector plate 30, and to this end a bushing assembly 32, FIG. 3, is secured to selector plate 30 and located on the shank of the stud 19, the selector or turret plate 30 then being rotatably related to stud 19 and retained in place by a nut 31 mounted on the threaded end of stud 19.

The rotary selector 30 is provided with a plurality of apertures 35 which are four in number in this instance spaced equidistantly at radial points corresponding to the centers of the lamps 12 and 13. As will be apparent from FIG. 1 and the description to follow, the apertures 35 in the selector plate are diametrically opposite one another so that on each 90° turn of the plate 30 an aperture 35 is centered on the lens of lamp 12 and another aperture 35 is centered on the lens of lamp 13. Thus, the centers of the lamp lenses are spaced a distance equal to the diameter of a circle, the center of which may be taken as the axis of stud 19; the apertures 35 are on the radii of this circle.

In order that the selector plate may be accurately positioned so that an aperture therein is centered on the lens of one of the lamps, an indexing means is provided and in accomplishing this the free ends of the respective arms 20 of the bracket 18 each support a detent roller 36, FIGS. 2 and 3 located in an opening in plate 22. Related index openings 37 (four in number) are formed in the outer periphery of the plate 30. The bracket arms 20 are of spring form, and hence when the plate 30 is turned from the position shown in FIG. 3, where the detents 36 are located in the index openings 37, the spring arms 20 are flexed or cammed to permit the selector plate to be turned to a different rotary position.

Two fiber optic cables A and B are shown in FIG. 1, each being supplied by a different manufacturer. Their receptor ends are different. The difference may take many different forms, but in this instance the difference is that cable A has a receptor end 40 of smaller diameter compared to the receptor end 41 of cable B. The opposite end of each cable is characterized by a fitting as 43, cable A, configured to receive and secure a light emitter, not shown.

Under and in accordance with the present invention, the selector turret is provided with a set of diametrically opposed hollow receptacles 45 and 46. The receptacles are detachably mounted in the selector plate apertures 35. This may be accomplished by a snap-on retainer 47 and a washer-type nut 48, FIG. 3. Consequently, receptacles as 45 and 46 may be easily interchanged to accept cable receptors of different configuration. Moreover, the whole turret 30 may be detached and substituted simply by removing nut 31. As for the receptacles 45 and 46, each is of a well-known type characterized by a spring biased retainer clip 49 and 50, respectively, FIG. 3, an edge of which projects into the aperture of the related receptacle.

Inasmuch as the receptors 40 and 41 are of different diameter, the receptacles 45 and 46 and their retainer clips are sized accordingly. The receptor end of the cable is inserted into the receptacle stud, camming the clip. Thus, when the groove as 49G, cable A, FIG. 1, is aligned with its adapter clip 50, the latter snaps into the groove and secures the receptor end of the cable; similarly with the receptor of cable B.

The receptacles 45 and 46, FIG. 1, are at diametrically opposite positions, and as shown in FIG. 1 there are two additional receptacles 55 and 56 at diametrically opposite positions. The latter two receptacles may, for purposes of disclosure, be assumed as configured identically to the receptacle 45, and therefore configured to accept receptor ends of two cables like cable B.

Consequently, in the embodiment shown, FIG. 1, four cables may be attached, three cables (B) of one manufacturer and one cable (A) of another manufacturer. It follows that the person using the selector apparatus 10, at maximum advantage, is able to illuminate two cables in one position of the selector turret when receptacles 55 and 56 are aligned with the lamps; or the selector turret may be turned 90° incidental to utilization of a second set of cables of A and B manufacture.

It will be appreciated that all four receptacles may be different. Further, the number of receptacles may be multiplied so that six cables may be serviced, and while the example given is one wherein the receptor ends are configured differently only in terms of diameter, whereby the receptacles need to vary only in terms of diameter, it will be appreciated that the receptacles may have to be of a kind other than the spring clip kind disclosed.

Figure 4:
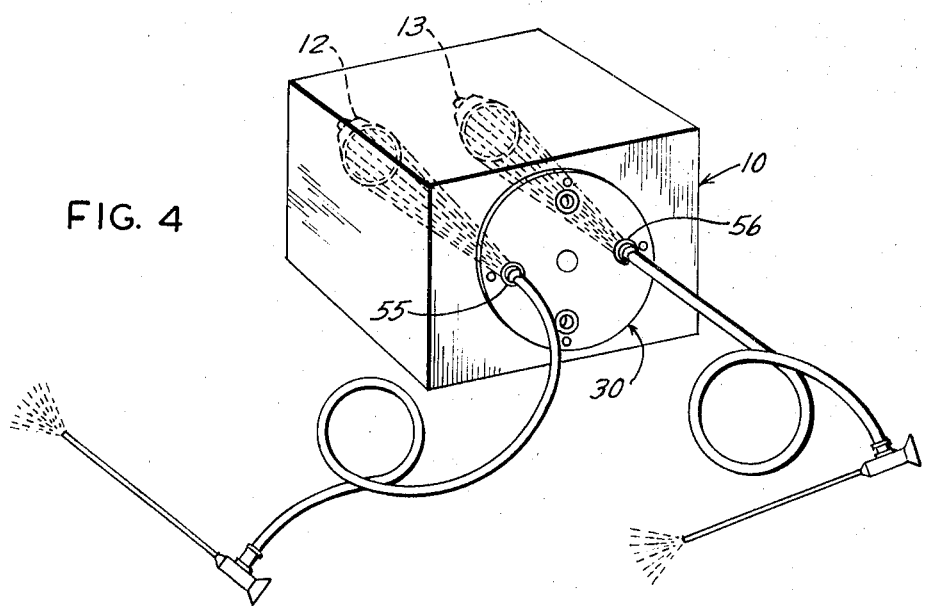
FIGS. 4 and 5 are schematic views showing features of utility.
Figure 5:
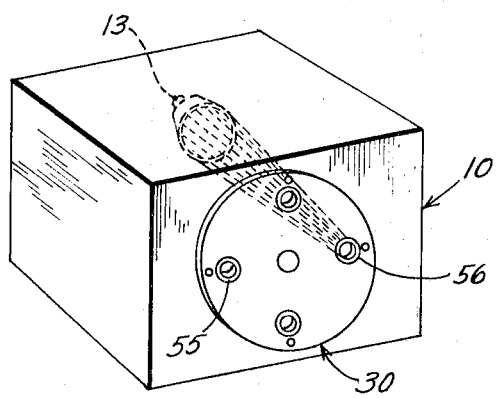

Ramifications are shown schematically in FIGS. 4 and 5. Referring to FIG. 4, the assembly includes a casing H housing the apparatus shown in FIGS. 1–3 with the selector plate 30 exposed at the front. Two cables are attached, enabling the technician to alternate between two instruments. Each lamp may be an arc lamp or an incandescent lamp. FIG. 5 shows a modification where only one lamp is used, but the selector 30, equipped with different kinds of receptacles, enables many different cables to be attached and related to the light source.

It will be seen from the foregoing that in accordance with the present invention a plurality of lamps are arranged for illuminating the receptor or so-called end face of a pair of fiber optic cables simultaneously. The person using the apparatus may in fact use only one lamp, in which event the receptor ends of successive cables may be aligned with the lamp by appropriately positioning the selector plate to service several cables selectively. It will also be appreciated that the apparatus may be provided with rheostats to enable the intensity of the lamps to be adjusted.

I claim:

1. Apparatus for selectively illuminating the receptor end face of fiber optic cables comprising, lamp support means presenting a lamp as the source of illumination, a movable selector positioned at the lens end of the lamp, and at least a pair of receptacles mounted on the selector, each receptacle having an aperture therein for receiving the receptor end of a fiber optic cable and being alignable with the lamp upon movement of the selector, said receptacle being of different configuration to enable respectively different cable receptors to be fitted thereto.

2. Apparatus according to claim 1 wherein the selector is a circular turret supporting said receptacles at different angular positions on an arc which intercepts the lamp lens.

3. Apparatus according to claim 2 including an indexing means for releasably holding the selector in a position where the aperture of a selector may be aligned with the lamp.

4. Apparatus according to claim 3 wherein the index means is characterized by a spring-biased detent engageable with an index opening in the turret.

5. Apparatus according to claim 3 wherein the receptables are detachable and wherein the turret is detachable.

6. Apparatus according to claim 1 having two lamps and at least two pairs of receptacles, the receptacles of each pair being at opposite ends of a diameter of the turret.

7. Apparatus according to claim 1 wherein the receptacles are detachable and the turret is detachable.

* * * * *

UNITED STATES PATENT OFFICE
CERTIFICATE OF CORRECTION

PATENT NO. : 3,831,017
DATED : August 20, 1974
INVENTOR(S) : WILLIAM F. AUER

It is certified that error appears in the above-identified patent and that said Letters Patent are hereby corrected as shown below:

In the Specification, column 1, line 31, "repitiously" should read -- repetitiously --, line 39, "scenorio" should read -- scenario --, line 55, "emboying" should read -- embodying --; column 3, line 28, cancel "C"; column 4, line 4, cancel "E".

In the Claims, claim 1, line 9, change "receptacle" to -- receptacles --.

Signed and Sealed this twenty-third Day of September 1975

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,831,017
DATED : August 20, 1974
INVENTOR(S) : William F. Auer

It is certified that error appears in the above—identified patent and that said Letters Patent are hereby corrected as shown below:

In the Claims:

Claim 3, line 3, change "selector" to -- receptacle

Claim 6, line 1, change "1" to -- 2 --

Claim 7, line 1, change "1" to -- 6 --

Signed and Sealed this twentieth Day of April 1976

[SEAL]

Attest:

RUTH C. MASON
Attesting Officer

C. MARSHALL DANN
Commissioner of Patents and Trademarks